US006904720B1

(12) United States Patent
Adolfson et al.

(10) Patent No.: US 6,904,720 B1
(45) Date of Patent: Jun. 14, 2005

(54) CONSTRUCTION ENCLOSURE SYSTEM

(75) Inventors: Brook P. Adolfson, Coon Rapids, MN (US); Ronald R. Miller, Anoka, MN (US)

(73) Assignee: Adolfson & Peterson, Inc., Minneapolis, MN (US)

( * ) Notice: Subject to any disclaimer, the term of this patent is extended or adjusted under 35 U.S.C. 154(b) by 29 days.

(21) Appl. No.: 10/034,932

(22) Filed: Oct. 25, 2001

Related U.S. Application Data

(60) Provisional application No. 60/243,235, filed on Oct. 25, 2000.

(51) Int. Cl.[7] .............................. E04H 9/00; E04B 2/74; E04B 2/88
(52) U.S. Cl. .............................. 52/63; 52/235; 52/762; 52/770; 52/772; 52/DIG. 12; 160/368.1; 160/399; 182/129
(58) Field of Search ........................... 52/63, 222, 235, 52/770, 772, 762, 767, 764, 781, 781.3, DIG. 12; 47/17; 248/229.24, 229.14, 231.61, 228.5, 248/230.5, 68.1, 74.1; 160/327, 380

(56) References Cited

U.S. PATENT DOCUMENTS

| | | | | |
|---|---|---|---|---|
| 392,431 | A | * 11/1888 | Higgins | ................ 248/229.24 |
| 1,438,534 | A | * 12/1922 | Kuen | ................... 248/229.14 |
| 2,631,076 | A | * 3/1953 | Redlich | ....................... 248/188 |
| 2,769,895 | A | * 11/1956 | Boord | ........................ 211/26 |
| 2,950,727 | A | 8/1960 | Dunn | |
| 2,994,413 | A | * 8/1961 | Levy | ......................... 52/36.6 |
| 3,121,470 | A | 2/1964 | Stone et al. | |
| 3,266,207 | A | * 8/1966 | Birum | ........................ 52/459 |
| 3,480,069 | A | 11/1969 | Handwerker | |
| 3,762,110 | A | 10/1973 | Boss, Jr. | |
| 3,805,816 | A | 4/1974 | Nolte | |
| 3,830,033 | A | 8/1974 | Gahler | |
| 3,843,083 | A | * 10/1974 | Anglbaud | .............. 248/229.14 |
| 3,995,715 | A | 12/1976 | Virtanen | |
| 4,307,864 | A | * 12/1981 | Benoit | ................... 248/222.11 |

(Continued)

OTHER PUBLICATIONS www.sailsystem.com/features.html (Jul. 18, 2000)—3 pages.

(Continued)

Primary Examiner—Robert Canfield
(74) Attorney, Agent, or Firm—Fredrikson & Byron PA

(57) ABSTRACT

There is provided a framework for a construction enclosure system comprising a plurality of brackets, a plurality of rigid elongated frame members, and a plurality of reinforcement members. The brackets are adapted to be attached to a structure under construction. The frame members are adapted to be retained by the brackets in a desired spatial relationship with an outer face of the structure. The frame members are adapted to retain one or more sheet-like enclosure panels. The reinforcement members are adapted to be secured against respective frame members to increase the rigidity of such frame members. One embodiment of the invention provides a frame member comprising a pair of elongated bodies adapted to be retained in a mated configuration to cooperatively define first and second channels therebetween, wherein each channel is adapted to retain one edge portion of a sheet-like enclosure panel.

30 Claims, 10 Drawing Sheets

U.S. PATENT DOCUMENTS

| | | | |
|---|---|---|---|
| 4,574,534 A | | 3/1986 | Beaton |
| 4,685,263 A | * | 8/1987 | Ting .......................... 52/235 |
| 4,732,234 A | | 3/1988 | Brickman |
| 4,736,563 A | * | 4/1988 | Bilhorn ....................... 52/460 |
| 4,736,921 A | * | 4/1988 | Zane et al. ............. 248/316.2 |
| 5,038,889 A | | 8/1991 | Jankowski |
| 5,161,641 A | | 11/1992 | Nusbaum |
| 5,181,684 A | * | 1/1993 | Sager ................... 248/231.61 |
| 5,333,425 A | | 8/1994 | Nickerson et al. |
| 5,408,770 A | | 4/1995 | Suzuki |
| 5,426,899 A | * | 6/1995 | Jones .......................... 52/63 |
| 5,546,713 A | * | 8/1996 | Voegele, Jr. et al. .......... 52/202 |
| 5,632,125 A | * | 5/1997 | Osanai ....................... 52/235 |
| 5,784,842 A | * | 7/1998 | Wackerbauer ................ 52/222 |
| 6,338,226 B1 | * | 1/2002 | Gauthier et al. ............... 52/63 |
| 6,523,790 B2 | * | 2/2003 | Sentpali et al. ............ 248/68.1 |

OTHER PUBLICATIONS www.sailsystem.com/index.html (Jun. 15, 2000)—1 page.

www.sailsystem.com/minnesota.html (Jun. 15, 2000)—1 page.

www.sailsystem.com/projects.html (Jun. 15, 2000)—1 page.

www.sailsystem.com/contacts.html (Jun. 15, 2000)—1 page.

www.scafserv.com/scafserv/tempbldg.html (Jul. 18, 2000)—4 pages.

www.tyco-unistrut.com/graphics/Mframe/mframe.html (Sep. 27, 2000)—1 page.

www.tyco-unistrut.com/pages/frames/frame2.html (Sep. 27, 2000)—1 page.

www.e-traxx.com/circleimage.html (May 11, 2000)—1 page.

* cited by examiner

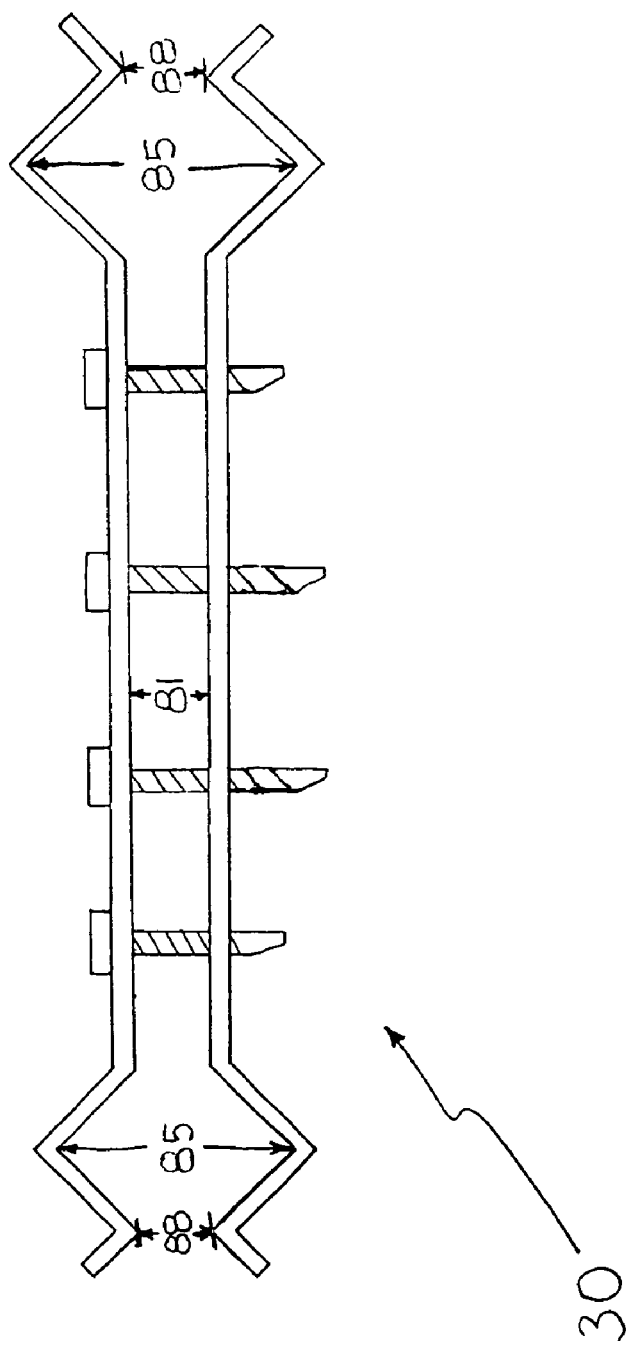

CONSTRUCTION ENCLOSURE SYSTEM

CROSS REFERENCE TO RELATED APPLICATIONS

The present application is a continuation of provisional U.S. patent application filed Oct. 25, 2000 and assigned Ser. No. 60/243,235, the entire disclosure of which is incorporated herein by reference.

FIELD OF THE INVENTION

The present invention relates generally to a construction enclosure system for at least partially enclosing a structure under construction. More particularly, this invention provides a plurality of frames that are adapted to retain one or more enclosure sheets used to at least partially enclose a building under construction.

BACKGROUND OF THE INVENTION

Buildings and other structures under construction are commonly enclosed, at least in part, during various stages of the building process. For example, it may be desirable to establish a contained environment in areas of a structure where fire protection is being applied. Likewise, certain types of cement and the like require controlled environmental conditions (e.g., low humidity and/or moderate temperature) to cure. In such situations, enclosure may be necessary to assure that the atmosphere in the work area is acceptable. Enclosure may be particularly desirable where a structure is built in cold or otherwise inclement weather. For example, workers may require protection from the elements to safely perform their duties. In this regard, high winds and extreme cold can be particularly problematic. Moreover, enclosure may be necessary when it is desired to prevent dust, fumes, debris, and the like from being carried beyond the construction site.

Many types and styles of enclosure systems have been proposed. See, for example, U.S. Pat. No. 2,950,727 (Dunn), U.S. Pat. No. 3,121,470 (Stone et al.), U.S. Pat. No. 3,480,069 (Handwerker), U.S. Pat. No. 3,762,110 (Boss, Jr.), U.S. Pat. No. 3,805,816 (Nolte), U.S. Pat. No. 3,830,033 (Gahler), U.S. Pat. No. 3,995,715 (Virtanen), U.S. Pat. No. 4,574,534 (Beaton), U.S. Pat. No. 4,732,234 (Brickman), U.S. Pat. No. 5,038,889 (Jankowski), U.S. Pat. No. 5,161,641 (Nusbaum), U.S. Pat. No. 5,333,425 (Nickerson et al.), and U.S. Pat. No. 5,408,770 (Suzuki).

Some construction enclosures comprise tarps tied directly to scaffolding erected about a structure under construction. Similarly, wooden frames covered with polyethylene sheets have been used. More recently, tarps or sheets have been used in conjunction with various vertical and/or horizontal frame members. Many of these systems, however, have been difficult to erect and dismantle. Moreover, they tend to be expensive, particularly those that are not reusable. Further, the sheets employed in such systems oftentimes cannot be easily moved from one level to the next to cover specific areas where work is being performed. Finally, some of these enclosure systems are not capable of withstanding the inclement weather conditions that are prevalent in many areas of the world.

Two recently developed enclosure systems have been more acceptable. The first system, referred to commercially as the "Sail System", is sold by Walton Technology, Inc., which is located in Richardson, Tex., U.S.A. This system employs a plurality of frame members that appear to be formed of a unitary extrusion having "C"-shaped tracks formed in the lateral sides of each frame member. The lateral sides of the sheets used with this system are defined by a rope welt. That is, each edge is folded over and secured to a rope, to form an enlarged edge region (or "welt"). The welts are slidably received in the "C"-shaped tracks. Each frame member appears to be substantially hollow. Generally, the frame members of this system are secured to buildings by means of cables that can be extended through holes in each frame member. Further information on the Sail System product can be found on the internet at www.sailsystem.com.

The second system, referred to commercially as the "e trax" enclosure system, is sold by Eagle Industries, Inc., which is located in Harahan, Louisianna, U.S.A. This system also employs a plurality of frame members, each comprising a frame body with "C"-shaped tracks formed in the lateral sides of each frame member. The body of each frame member consists of a unitary aluminum extrusion of solid construction. Two generally parallel fins protruding outwardly from the back of each frame member extend along substantially the entire length of the frame body. Like the "Sail System", the "e trax" frame members are apparently secured to buildings using cables. Further information on the Sail System can be found on the internet at www.e-traxx.com/circleimage.html.

BRIEF DESCRIPTION OF THE DRAWINGS

FIG. 10 is an end view of alternative preferred frame member of the present invention.

SUMMARY

Figure 1:
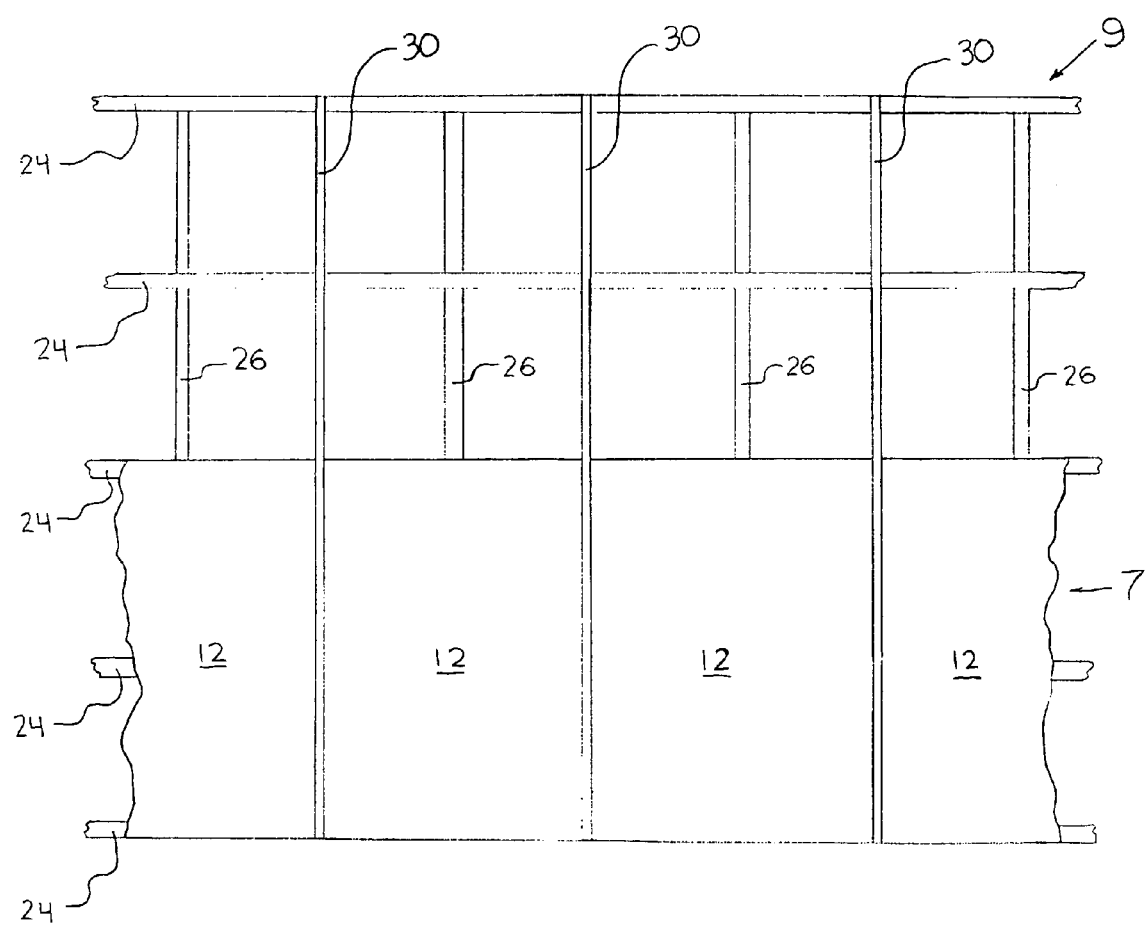
FIG. 1 is a front view of a construction enclosure system partially enclosing a building under construction in accordance with one embodiment of the present invention.

The present invention provides a construction enclosure system framework that that is truly structural, and therefore exceptionally stable and durable, yet is also resuable. One embodiment of the invention provides a framework comprising a plurality of brackets, a plurality of frame members, and a plurality of reinforcement members. The brackets are adapted to be rigidly and removably attached to a structure under construction. The frame members are rigid and elongated and are adapted to be fixedly retained by the brackets in a desired spatial relationship with an outer face of the structure. Each frame member defines first and second substantially parallel channels that extend respectively along first and second side regions thereof. Each channel is adapted to slidably retain an edge portion of a sheet-like enclosure panel, wherein the edge portion has a greater thickness than a peripheral panel area extending therefrom. The reinforcement members are adapted to be secured against respective frame members to increase the rigidity of such frame members.

In another embodiment of the invention, there is provided a construction enclosure system includes a plurality of sheet-like enclosure panels and a framework that comprising a plurality of brackets, a plurality of frame members, and a plurality of reinforcement members. Each of the enclosure panels has a major surface and substantially parallel first and second edge portions, wherein each edge portion has a greater thickness than a peripheral panel area extending therefrom. The brackets are adapted to be rigidly and removably attached to a structure under construction. The frame members are rigid and elongated and are adapted to be fixedly retained by the brackets in a desired spatial relationship with an outer face of the structure. Each of the frame members defines first and second substantially parallel channels extending respectively along first and second side regions thereof. Each channel is adapted to slidably retain one of said panel edge portions. The reinforcement members are adapted to be secured against respective frame members to increase the rigidity of such frame members.

In yet another embodiment of the invention, there is provided a frame member for a construction enclosure system. The frame member comprises first and second elongated bodies adapted to be retained in a mated configuration to cooperatively define first and second substantially parallel channels and first and second slots communicating respectively with the first and second channels. The first and second slotted channels extend respectively along first and second side regions of the frame member. Each of the slotted channels is adapted to slidably retain an edge portion of a sheet-like enclosure panel wherein the edge portion has a greater thickness than a peripheral panel area extending therefrom.

In still another embodiment of the present invention, there is provided frame member for a construction enclosure system. The frame member comprises first and second elongated bodies adapted to be retained in a mated configuration to cooperatively define a channel and a slot communicating with the channel. The slotted channel extends along a first side region of the frame member and is adapted to slidably retain an edge portion of a sheet-like enclosure panel wherein the edge portion has a greater thickness than a peripheral panel area extending therefrom.

In yet another embodiment of the invention, there is provided a plurality of brackets for a construction enclosure system. The brackets each comprise a base region and a mounting region. Each base region is adapted to be rigidly and removably secured to a floor of a structure under construction. The mounting regions are adapted to fixedly retain a plurality of rigid elongated frame members in a desired spatial relationship with an outer face of the structure while allowing the frame members to slidably retain a plurality of sheet-like enclosure panels, wherein the frame members each comprise a pair of elongated bodies retained in a mated configuration.

The present invention extends to a method of at least partially enclosing a structure under construction. The method comprises rigidly and removably attaching a plurality of brackets to the structure. A plurality of rigid elongated frame members are provided, as are a plurality of reinforcement members that are adapted to be secured against respective frame members. Each frame member defines first and second substantially parallel channels extending respectively along first and second side regions thereof. The reinforcement members are secured against respective frame members to increase the rigidity of such frame members, thereby defining reinforced frame members. The reinforced frame members are rigidly secured to the brackets such that the reinforced frame members are fixedly retained in a desired spatial relationship with an outer face of the structure. There is provided a sheet-like enclosure panel having first and second edge portions, wherein each edge portion has a thickness greater than a peripheral panel area extending therefrom. The enclosure are panels positioned between a pair of the reinforced frame members such that the first edge portion is slidably retained in one of the channels in a first reinforced frame member of the pair and the second edge portion is slidably retained in one of the channels in a second reinforced frame member of the pair.

The present invention also extends to a structure constructed by a method involving the present construction enclosure system. The method comprises rigidly and removably attaching a plurality of brackets to the structure. A plurality of rigid elongated frame members are provided, as are a plurality of reinforcement members that are adapted to be secured against respective frame members. Each frame member defines first and second substantially parallel channels extending respectively along first and second side regions thereof. The reinforcement members are secured against respective frame members to increase the rigidity of such frame members, thereby defining reinforced frame members. The reinforced frame members are rigidly secured to the brackets such that the reinforced frame members are fixedly retained in a desired spatial relationship with an outer face of the structure. There is provided a sheet-like enclosure panel having first and second edge portions, wherein each edge portion has a thickness greater than a peripheral panel area extending therefrom. The enclosure are panels positioned between a pair of the reinforced frame members such that the first edge portion is slidably retained in one of the channels in a first reinforced frame member of the pair and the second edge portion is slidably retained in one of the channels in a second reinforced frame member of the pair.

DETAILED DESCRIPTION OF THE PREFERRED EMBODIMENTS

FIG. 1 shows one embodiment of a construction enclosure system in accordance with the present invention. The illustrated construction enclosure system 7 generally includes a plurality of enclosure panels 12, a plurality of brackets 40 (not shown), a plurality of frame members 30, and a plurality of reinforcement members 60 (not shown). In FIG. 1, the frame members 30 have been configured in a vertical orientation adjacent an outer face of a building 9. It can be particularly advantageous to configure the frame members 30 in a generally vertical orientation, as this facilitates moving the enclosure panels 12 from one level of the building 9 to the next. For example, in a preferred embodiment, each enclosure panel is slidably retained between an adjacent pair of frame members 30 that extend vertically from the lowermost level of a building to the uppermost level. Such embodiments allow the enclosure panels to be moved up and down the building to enclose one or more desired levels simply by sliding the panels along the frame members. As will be appreciated by those skilled in the art, however, the frame members of the present invention can alternatively be secured in a horizontal or angled configuration. If so desired, some frame members can be configured vertically, and others can be configured horizontally and/or at an angle.

The frame members 30 illustrated in FIG. 1 are spaced about a periphery of the building 9 and carry a plurality of enclosure panels 12. Each of the illustrated enclosure panels 12 is secured between a pair of adjacent frame members 30. The spacing of the frame members can be varied to meet the particular requirements of a given application. In many cases, spacing frame members 30 every 10 feet about a building is acceptable. Preferably, adjacent frame members 30 are spaced at least 15 feet apart. If desired, though, the structural nature of the present construction enclosure system would enable adjacent frame members 30 to be spaced even farther apart. Due to the structural nature of the present enclosure system, adjacent frame members 30 can be spaced apart 18 feet or more and still resist winds in excess of 50–60 miles per hour without exhibiting significant damage.

The enclosure system 7 illustrated in FIG. 1 has been configured so as to enclose the bottom two levels of the building 9. It is to be understood, however, that the enclosure system can be used to enclose any desired portion of a building. For example, it may be desirable to enclose all of the levels of a building in some cases. In other cases, the enclosure system can be configured to provide a simple windbreak for certain of areas of a structure. For example, a single enclosure panel can be secured against the face of a building to at least partially shield nearby workers from wind, rain, and other elements. While this type of arrangement would not form a complete enclosure of such work areas, it would provide enhanced protection for workers who may be required to perform tasks that are difficult or impossible in strong wind or rain. Thus, it is to be understood that use herein of terms such as "enclose" and "enclosure" is not limited to situations where an entirely closed-off space is formed, but would also include situations where only a partial or incomplete enclosure is created (such as where one or more enclosure panels are used to provide a simple windbreak).

The building 9 illustrated in FIG. 1 is a four level structure having a plurality of floors 24 and vertical support members 26. As would be apparent to those skilled in the art, the present enclosure system can be used to enclose buildings of any size or shape. Moreover, the present enclosure system is by no means limited to use on buildings, but would extend to any other structure on which it may be desirable to form an enclosure. Thus, while reference herein is commonly made to the enclosure of the building, it is to be understood that such discussions relate equally well to other structures.

The construction enclosure system comprises a framework that includes a plurality of brackets 40. Several advantages are gained by using brackets to retain the frame members 30 in their desired positions. Brackets are less apt to become an obstacle or nuisance than other attachment means like cables and ropes. When cables are used to secure frame members to a building, the cables must be anchored somewhere within the building. In the most favorable scenario, the frame members are simply strapped to whatever vertical support beams happen to be nearby. While this may be possible for those frame members that are positioned near support beams, some frame members may not be close enough to a support beam for this to be feasible. Thus, some frame members may need to be secured elsewhere within the building. For example, they may be attached to the floors or ceilings of the building (or anchors set therein). This can make for a unnecessarily complicated installation process.

The brackets of the present invention are adapted to be rigidly attached to a building under construction. Because brackets can be secured to a building rigidly, they offer several benefits over cables and ropes used with existing enclosure systems. For example, brackets, being structural attachment means, provide an unyielding structural foundation for an enclosure system. Moreover, by rigidly securing such brackets to frame members that are themselves rigid, in accordance with one embodiment of the invention, the enclosure system truly becomes a structural extension of the building. This provides a level of stability that would be difficult, if not impossible, to attain with a non-structural enclosure system.

Prior art enclosures that are strapped to, or suspended from, a structure may be blown about by strong winds. For example, the enclosure panels may be blown back and forth against the face of the building. This may cause the frame members themselves to move back and forth along the panels, which in turn may cause the cables secured within the building to thrash about. This would increase the risk of damage to the enclosure panels and the other components of the enclosure system.

The structural nature of the present enclosure system assures that the frame members may be retained in a fixed configuration. Once the frame members are secured in their final positions, they are restrained against unintentional movement, such as may otherwise be caused by wind. Even during strong, gusty winds, the frame members of the present invention are retained in a fixed configuration. Movement of the enclosure panels is also limited to a certain range that depends on how taut the panels are mounted to the frame members. Thus, the structural nature of the present enclosure system assures that the frame members and the enclosure panels will exhibit no more than a minimal amount of movement, even in the face of inclement weather.

Figure 4:
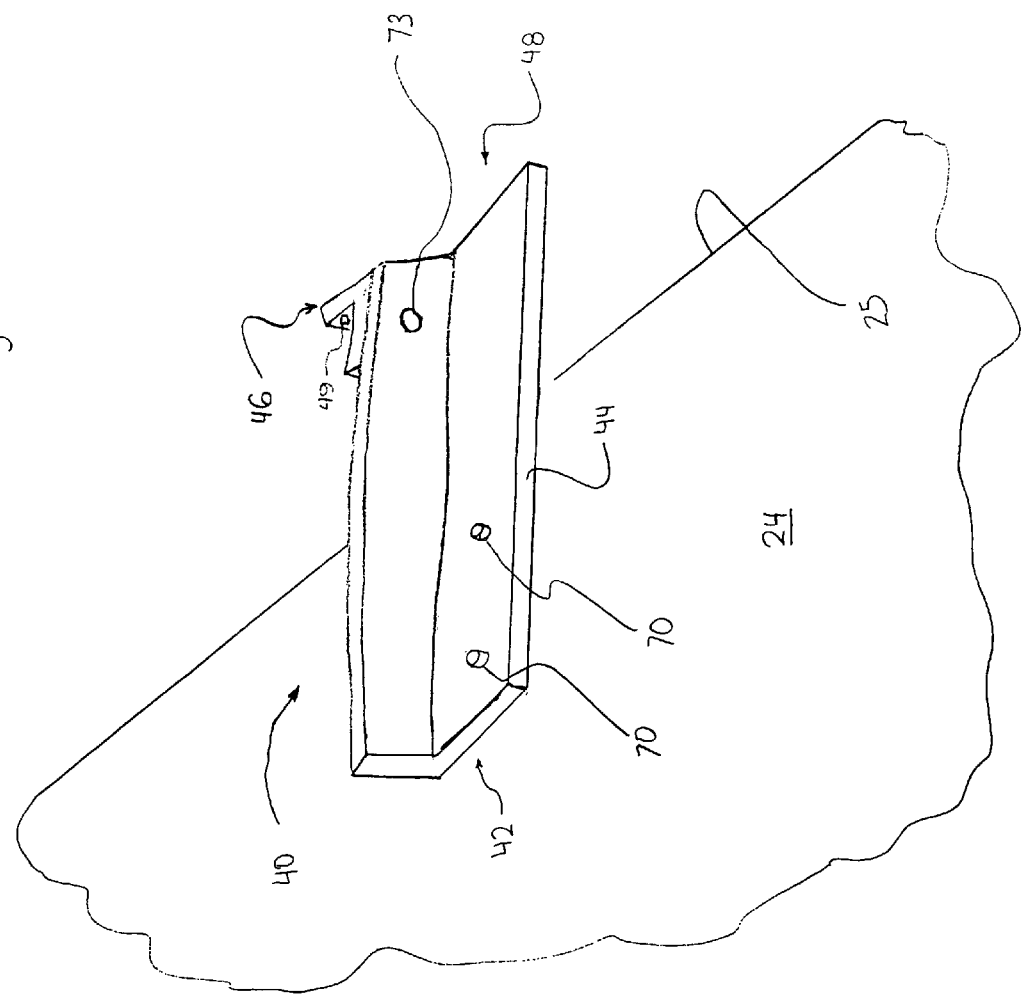
FIG. 4 is a perspective view of a preferred bracket design of the present invention.

FIG. 4 illustrates a preferred bracket design that is particularly useful with the construction enclosure system of the present invention. It is to be understood that, while the illustrated bracket design has been found to work particularly well with the present construction enclosure system, other types of brackets can also be used. Each bracket 40 has a base region 44 that is adapted to be removably secured to a structure under construction. In most cases, it will be preferable to secure the brackets to the floors 24 of a building. However, this is certainly not a requirement, as the brackets can be attached to any of the building's structural members.

The base region of each bracket can be secured to a building using any number of attachment means, such as screws, bolts, anchors, and the like. It is desirable that the brackets be removably secured to the building, so they can be reused. When the brackets are secured to the floors of a building, which are commonly formed of concrete, concrete anchors may be a preferred attachment means. The base region 44 of the bracket 40 illustrated in FIG. 4 has been secured to the floor 24 of a building with two anchors 70. When a bracket 40 is anchored using conventional bolts or screws, it is preferable to use at least two spaced-apart anchors 70, so as to prevent the anchored bracket from pivoting (such as may occur when a bracket is anchored by a single bolt or screw).

In many cases, it will be desirable to secure the brackets in a planking configuration, such as is illustrated in FIG. 4, wherein a proximal end 42 of each bracket 40 is positioned inwardly from a peripheral edge 25 of the floor 24, while a distal end 48 of the bracket extends outwardly from such edge 25. Such an arrangement facilitates spacing the frame members outwardly from the outer face of the building. It is estimated that brackets 40 of the present invention would allow for a spacing of at least 18–24 inches from the outer face of a building. However, it will likely be desirable in many cases to space the frame members 12 inches or less from the outer face of the building, so as to form a more or less contained envelope within the structure.

The brackets each have a mounting region 46 that is adapted to be secured, either directly or via a reinforcement member (as discussed below), to a frame member to fixedly retain such frame member in a desired spatial relationship with an outer face of a building. The mounting region 46 of the bracket 40 illustrated in FIG. 4 is at the distal end 48 of the bracket 40. The illustrated mounting region 46 is a discrete body that is removably attached to the distal end 48 of the bracket 40 via a bracket bolt 73. While this mounting region 46 is generally "L"-shaped, a variety of other configurations can be used. Moreover, the mounting region 46 can be integral in construction with the rest of the bracket. This may be preferable in environments where weather conditions tend to be particularly severe, as integrally constructed brackets would obviate the possibility of play in the bracket assembly (such as would result if the bracket bolt 73 were to become loose).

The mounting regions 46 of the brackets 40 are adapted to fixedly retain the frame members 30 in their desired final positions while allowing the frame members 30 to slidably retain the enclosure panels 12. Thus, the brackets 40 are adapted to be secured to the frame members without obstructing the channels 35 along which the enclosure panels 12 are intended to be movable. This can be accomplished by attaching the mounting regions of the brackets, either directly or via respective reinforcement members, to an area of each frame member distal from the channels defined by each frame member. For example, in accordance with a particularly preferred embodiment, each frame member has a central span to which a bracket or a reinforcement member can be attached without obstructing the channels (as is more thoroughly discussed below).

As noted above, the mounting regions of the brackets can be secured directly to the frame members. For example, in one embodiment (not shown), the frame members are secured to the brackets by a plurality of fasteners connecting the frame members directly to the mounting regions of respective brackets. In such an embodiment, reinforcement members of the present invention (which will be more thoroughly discussed below) can be secured to that side of the frame member that is not secured to a bracket.

Figure 7:
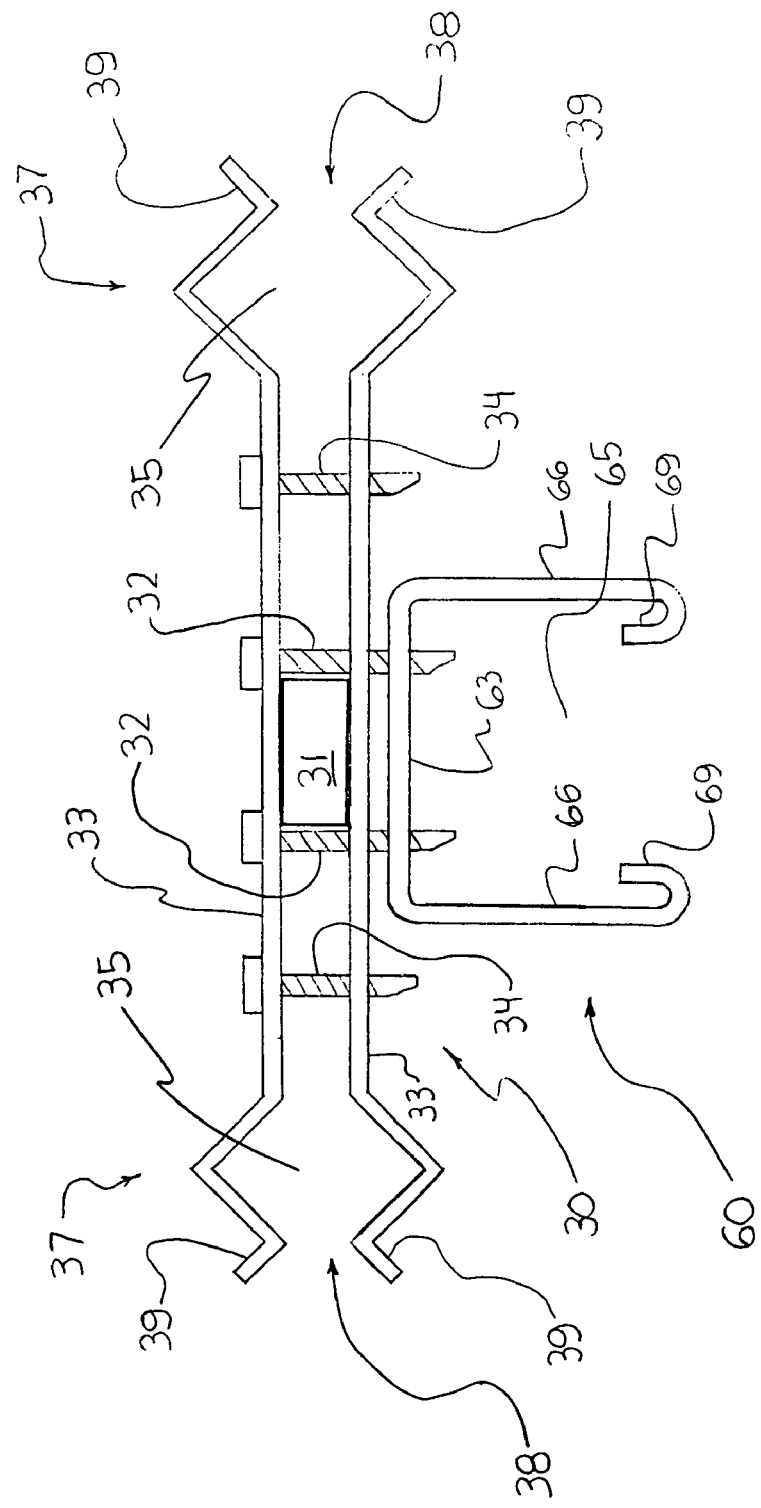
FIG. 7 is an end view of a preferred reinforcement member of the invention that is attached to the frame member illustrated in FIG. 5.
Figure 8:
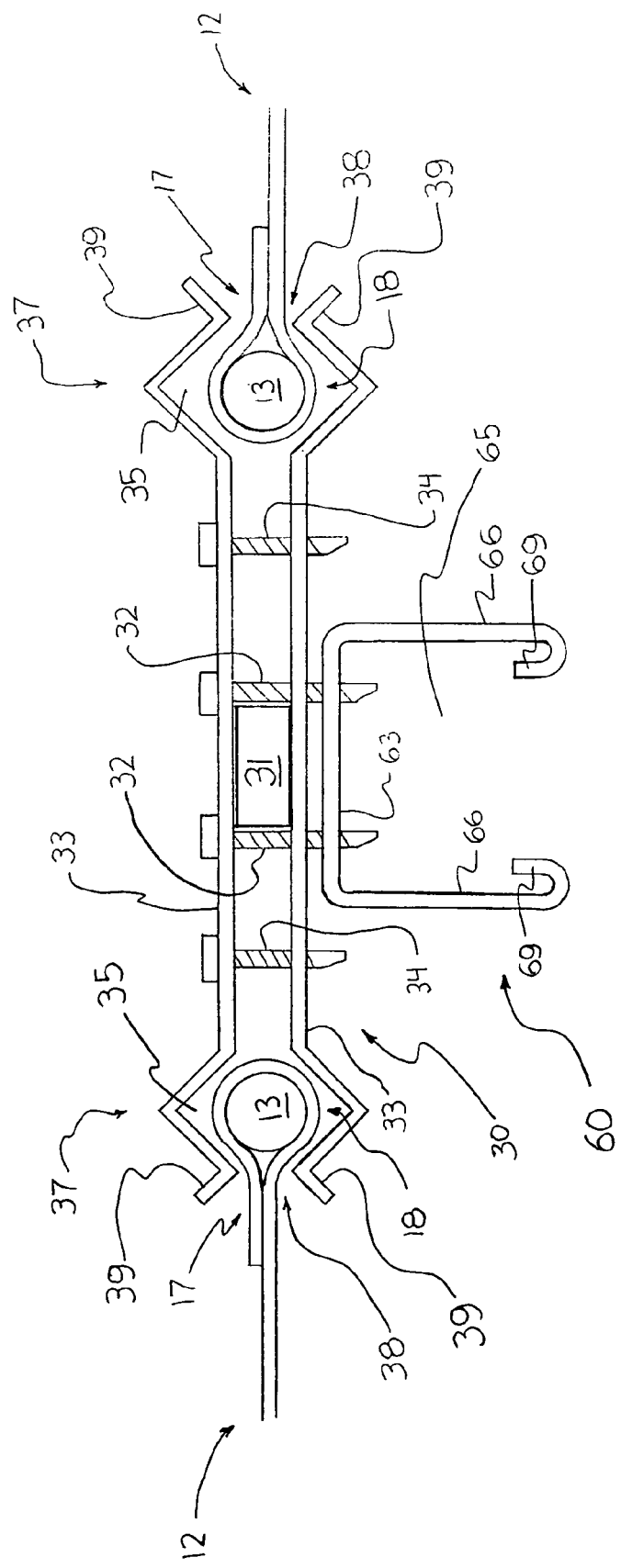
FIG. 8 is an end view of the attached reinforcement and frame members illustrated in FIG. 7 wherein an enclosure panel is slidably retained in each of the channels defined by the frame member.

In a preferred embodiment, however, each frame member 30 is adapted to be retained to the brackets 40 via a reinforcement member 60. For example, FIG. 7 illustrates one such embodiment wherein a reinforcement member 60 has been secured against an interior side of a frame member 30 and is adapted to be further attached to a bracket 30 (not shown) extending from a building.

Figure 9:
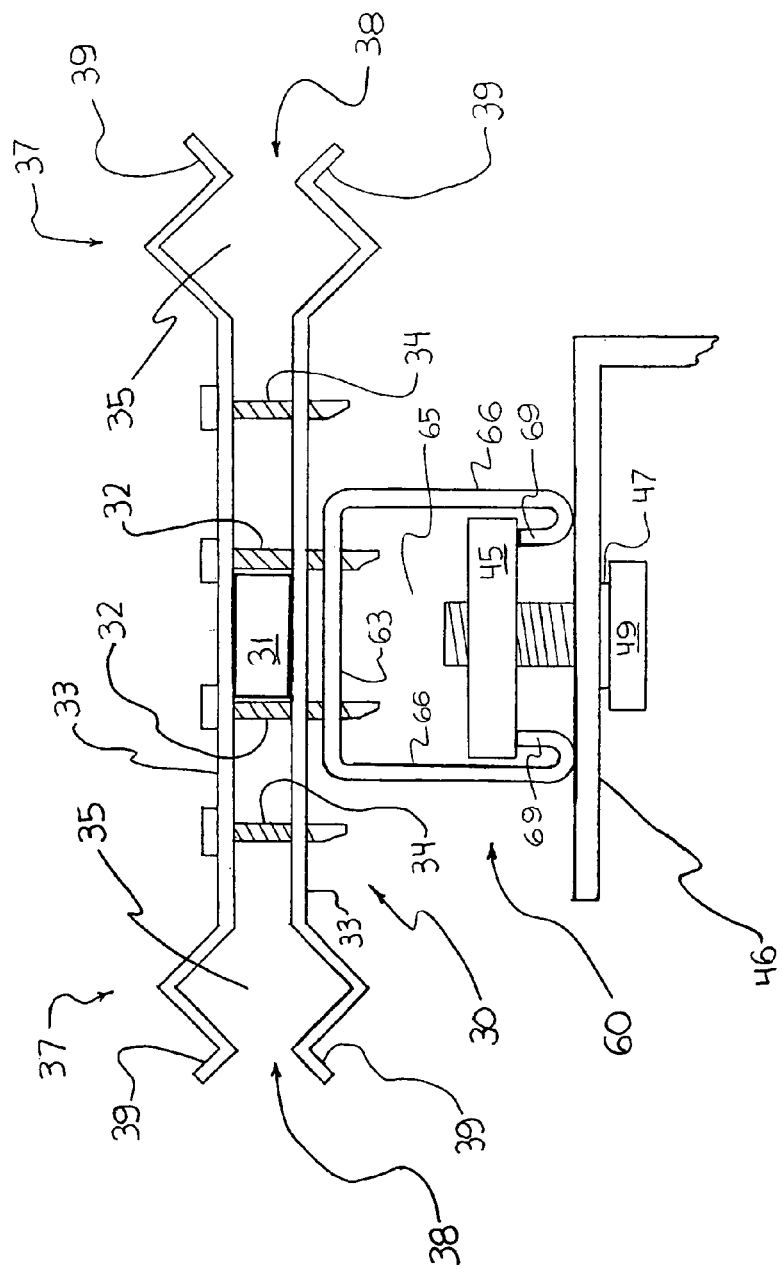
FIG. 9 is an end view of the attached reinforcement and frame members illustrated in FIG. 8 wherein the reinforcement member is secured to the mounting region of a preferred bracket of the present invention.

FIG. 9 illustrates a preferred reinforcement member 60 that is secured to the mounting region 46 of a bracket by a particularly useful mounting assembly. A mounting bolt 49 connects the bracket mounting region 46 to a spring nut member 45 that is secured behind the inturned edges 69 of the reinforcement member 60. A washer 47 is optionally provided between the head of the mounting bolt 49 and the mounting region 46 of the bracket. While this mounting assembly has been found to work particularly well with the present framework, the frame members 30 could be secured to the brackets in any desired manner. The selection of the ideal mounting assembly will be well within the purview of those skilled in the present art and is not discussed in further detail.

The framework of the present construction enclosure system includes a plurality of rigid elongated frame members 30 adapted to be fixedly retained by the brackets in a desired spatial relationship with an outer face of a building. In many applications it is desirable to secure the frame members adjacent the outer face of the building. For example, to form a substantially contained envelope within an enclosed area of the building, the frame members are preferably secured as close as possible against the outer face of the building. In some cases, it is desirable to secure the frame members flush against the face of the building. For example, this is advantageous when it is desired to isolate respective environments within different areas or levels of a building. Such configurations are particularly useful in preventing dust, fumes, or heat from escaping the enclosed portion of the building.

It is not necessary that the frame members be positioned directly against an outer face of a structure. As noted above, for example, it may be desirable to space the frame members outwardly from the side of a building. This can be done to accommodate irregularities in the shape or periphery of a building. For example, where certain floors of a building extend outwardly beyond other floors, it may be necessary to space the frame members different distances from different floors to achieve a vertical frame configuration. Likewise, it can be advantageous to space frame members outwardly from areas of a building that are semi-circular or otherwise irregularly shaped so as to prevent abrasive contact between the panels and such areas of the building.

In accordance with one embodiment of the present invention, the frame members 30 each define first and second channels 35 that extend respectively along first and second side regions of the frame member 30. Desirably, the first and second channels 35 of each frame member 30 are substantially parallel to one another. Conjointly, the frame members 30 are desirably positioned about a building such that adjacent frame members are parallel to one another (as illustrated in FIG. 1), as this facilitates sliding the enclosure panels 12 along the frame members 30.

As noted above, each channel 35 is adapted to slidably retain an edge portion 18 of an enclosure panel 12 wherein the edge portion has a greater thickness than a peripheral panel area 17 extending therefrom. For example, each channel 35 is preferably adapted to slidably retain an enlarged edge portion 18 of an enclosure panel 12. In one useful embodiment, each frame member 30 comprises a single elongated body with two generally opposed lateral side regions each defining a channel that has a generally "C"-shaped cross-sectional configuration.

The channels 35 desirably extend along a substantial length of each frame member 30. In a preferred embodiment, the channels 35 extends along the entire length of the frame members. This allows enclosure panels secured between an adjacent pair of such frame members to be moved along the entire length of the frame members. Moreover, it facilitates connecting a plurality of frame members in an end-to-end configuration such that the channels 35 of the connected frame members 30 form continuous paths. For example, frame members can be connected to span the entire height of a building. In such embodiments, the enclosure panels can be slidably moved along the connected frame members to any desired level(s) of the building.

The invention extends to a number of preferred frame member 30 designs that have been found to be particularly well suited for use with the present enclosure system. It is to be understood that the present enclosure system is not limited to use with these or any other frame members, nor are these preferred frame members limited to use with the present enclosure system. In fact, as will be obvious to those skilled in the present art, these preferred frame members are also be particularly advantageous when used with a variety of other construction enclosure systems.

Figure 5:
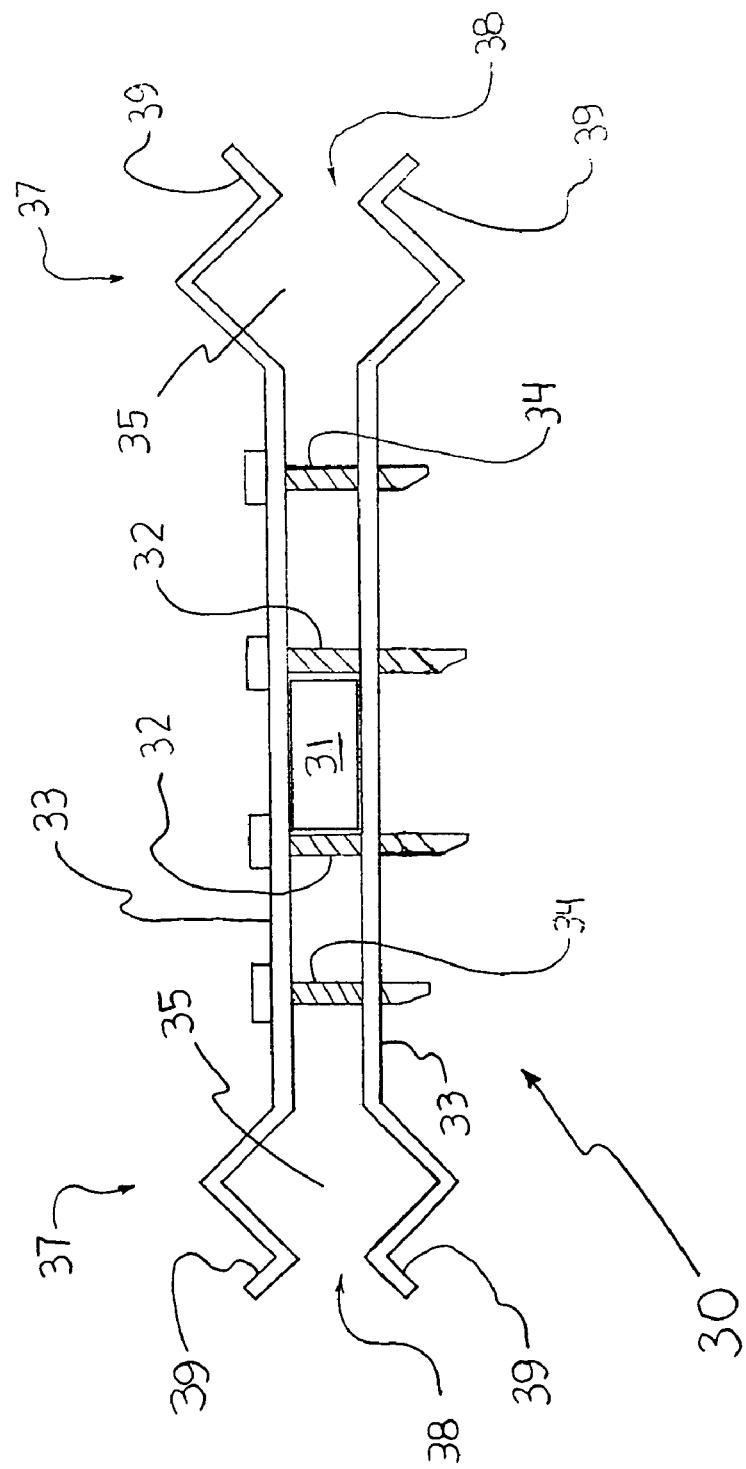
FIG. 5 is an end view of a preferred frame member of the present invention.

In accordance with one particularly preferred embodiment of the invention, a frame member comprises first and second elongated bodies that are adapted to be retained in a mated configuration to cooperatively define at least one channel and a slot communicating with the channel. In a preferred embodiment, two bodies are adapted to be retained in a mated configuration to cooperatively define first and second channels and first and second slots communicating respectively with the first and second channels. FIG. 5 illustrates an end view of one such embodiment wherein there is provided a frame member 30 comprising a pair of bodies 33 secured in a mated configuration. In this particular embodiment, the mated bodies are plates. Plates are particularly desirable as they can be readily bent or otherwise machined into a desired configuration. For example, the mated plates 33 illustrated in FIG. 5 have confronting bends that define the channels 38 between the plates 33. It is not necessary, of course, that the bodies be plates. In fact, it is anticipated that a variety of elongated bodies could be suitably mated to cooperatively define one or more slotted channels therebetween in accordance with the present invention.

As noted above, the frame member 30 illustrated in FIG. 5 defines two substantially parallel channels 35. Each of the illustrated channels 35 is adapted to slidably retain an edge portion 18 of an enclosure panel 12 wherein the edge portion 18 has a greater thickness than a peripheral panel area 17 extending from such edge portion 18. In order for the panel edge portions 18 to be retained within the channels 35, the edge portions 18 desirably have a thickness that is greater than the width of the slots 38. Conjointly, the panel edge portions 18 desirably have a thickness that is less than the width of the channels 35, such that the panel edge portions 18 will be slidable within the channels 35. This is perhaps best seen with reference to FIG. 6, wherein the thickness of the illustrated panel edge portions 18 is greater than the width of the slots 38, yet smaller than the width of the channels 35.

Figure 6:
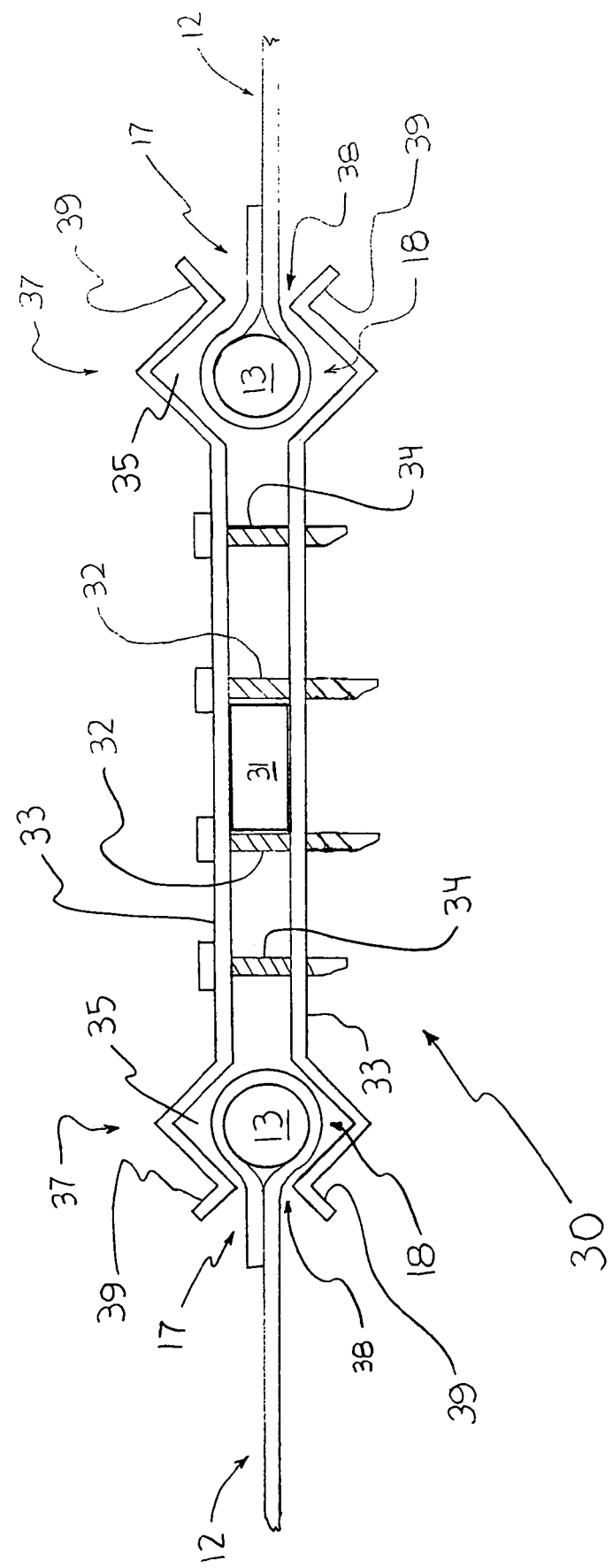
FIG. 6 is an end view of the frame member illustrated in FIG. 5 wherein an enclosure panel is slidably retained in each of the channels defined by the frame member.

As is illustrated in FIG. 6, the communicating first channel and first slot together define a first slotted channel extending along a first side region of the frame member. Likewise, the communicating second channel and second slot together define a second slotted channel extending along a second side region of the frame member. The edge portion 18 of an enclosure panel 12 is retained within each channel 35 of the illustrated frame member 30, while a peripheral panel area 17 extending therefrom extends through the adjacent slot 38.

In accordance with the particularly preferred embodiment shown in FIG. 6, each slot 38 is defined between a side edge 39 of the first plate 33 and an adjacent side edge 39 of the second plate 33. Each pair of adjacent side edges 39 has a divergent configuration that is adapted to reduce abrasive contact between the side edges 39 of the frame member 30 and the enclosure panels 12 extending from the channels 35 defined by the frame member 30. More specifically, each of the illustrated side edges 39 is bent outwardly such that when the plates 33 are secured in the desired mated position, the enclosure panels 12 slidably retained within the channels and extending through the slots 38 will tend not to contact the ends of the side edges 39. Such configurations are particularly desirable as they can minimize the abrasive contact that occurs between the adjacent side edges 39 of the frame members 30 and the enclosure panels 12 carried by the frame members 30.

It should be noted that each frame member of the present construction enclosure system need not define two channels. For example, in one useful embodiment, (not shown) there is provided a frame member 30 comprising first and second bodies 33 adapted to be retained in a mated configuration to cooperatively define a single channel 35 and a slot 38 communicating with the channel 35. The channel 35 and the slot 38 together define a slotted channel that extends along a first side region of the frame member. As noted above, such a channel 35 is desirably adapted to slidably retain an edge portion of a sheet-like enclosure panel wherein the edge portion has a greater thickness than a peripheral panel area extending therefrom.

It may be desirable to provide an internal surface of each channel 35 with a coating that will reduce a friction coefficient of such internal surface. An internal surface of each slot 38 can also be provided with a low friction coating. If desired, the entire interior surface area of each channel 35 and/or each slot 38 can be provided with a low friction coating. Such coatings can reduce the static and dynamic friction coefficients between the frame members and the enclosure panels that are carried slidably by the frame members.

It may be economically advantageous to apply such coatings over the entire surface area of a frame member. For example, in embodiments where each frame member comprises a mated pair of metal plates, it may be efficient to provide a galvanized coating over the entire surface area of each plate. Galvanized zinc coatings have been found to work well in reducing the friction coefficients between the channels and slots of the frame members and the enclosure panels carried therein. As would be obvious to those skilled in the present art, a wide variety of other low friction coatings could also be used to achieve the desired effect.

It is particularly advantageous to provide a frame member that comprises two separate bodies. This allows a spacing distance between the mated bodies to be varied. The spacing distance, referred to generally by reference number 81, is best seen with reference to FIG. 10, which illustrates a pair of plates 33 that have been secured in a mated position using only a plurality of fasteners 32, 34 (note that the spacing distance reference numeral 81 has been omitted from the other drawings due to the inclusion of a spacer 31 between the plates 33 in such drawings).

The preferred frame member 30 illustrated in FIG. 5 exemplifies the manner in which a desired spacing distance can be provided by selecting the size of the spacer 31 sandwiched between the mated plates 33. Specifically, it is the thickness of this spacer 31 that dictates the spacing distance between the plates 33. The spacer 31 used with a given frame member 30 can be selected to have any desired thickness. The selection of the spacer thickness also substantially determines the dimensions of the channels 35 and slots 38 of the frame members 30, as is discussed in greater detail below.

The spacing distance between the mated bodies of a frame member can be adjusted to provide a corresponding channel width and a corresponding slot width. This is perhaps best seen with reference to FIG. 10, wherein the channel width is illustrated generally by the reference numeral 85, while the slot width is illustrated generally by the reference numeral 88. The channel width 85, of course, may vary in magnitude at different points of the channel depending on the configuration of a given channel. For example, when a channel is defined between generally "V"-shaped bends, such as is illustrated in FIG. 10, the channel width 85 will tend to be greatest at the midpoints of the bends. For example, the channel width 85 of the frame member 30 illustrated in FIG. 10 is shown at a point between the confronting bends where the channel width is at a maximum. In embodiments where each channel is defined between semicircular confronting bends, the channel width would likewise be greatest at the midpoint of each bend. Comparatively, in embodiments of the invention wherein each channel has a square shape, the channel width would be the same at all points of the bends.

As noted above, the spacing distance can be adjusted by varying the thickness of the spacer 31 sandwiched between the plates 33. By increasing the thickness of the spacer 31, the width of each channel 35 is increased, as is the width of each slot 38. Thus, the spacing distance of such a frame member 30 can be adjusted to accommodate enclosure panels having differently sized edge portions and/or peripheral panel areas having different thicknesses. In this manner, the channels 35 and slots 38 of a single set of frame members 30 can be adapted to accommodate a variety of differently dimensioned enclosure panels.

The illustrated spacer 31 comprises a body that is discrete from the bodies 33 between which it is sandwiched. If so desired, however, a structure integral in construction with one or both mated bodies can provide the spacing function, in place of the spacer 31. For example, one of the bodies to be mated can be provided with a spacing structure integral with such body, so as to provide a desired spacing distance between the bodies when mated with the spacing structure abutting the other body. Alternatively, each body can be provided with a spacing structure so as to provide a desired spacing distance when two such bodies are mated with their spacing structures abutting one another. As will be appreciated by those skilled in the present art, a great many variants would be suitable to serve this purpose.

It is not possible to adjust the channel and slot dimensions of frame members used with existing construction enclosure systems. Thus, a given set of prior art frame members could only be used with enclosure panels having certain predetermined edge and panel dimensions. To the contrary, the present frame members can be used with different enclosure panels having a variety of different edge and panel thicknesses.

This is a substantial improvement over prior art frame members as this adjustability allows a single set of frame members to be repeatedly used with different enclosure panels. This is beneficial for a number of reasons. For example, enclosure panels may wear out before a set of frame members need to be replaced. Thus, an existing set of frame members could be adapted for use with a new set of enclosure panels even if the replacement panels have different edge or panel thicknesses than the original set. Further, a single set of frame members could be used for different jobs that require different types of enclosure panels. For example, the enclosure panels used during cold weather may be insulated, and may be thicker than those used during warm weather. A single set of the present frame members could be adjusted for use with both types of panels.

In the preferred embodiment illustrated in FIG. 5, the channels 35 are defined by bends in both plates 33. The illustrated plates 33 have been secured alongside one another in a mated configuration such that the two bends in the upper plate are aligned with, and confront, the two bends in the lower plate. Each plate 33 has a central span defined between the two bends in the plate. In accordance with a preferred embodiment, the central span of the each plate 33 has no bends and is substantially planar.

The plates 33 illustrated in FIG. 5 have bends that are generally "V"-shaped in accordance with a preferred embodiment of the invention. Such "V"-shaped bends are particularly easy to machine, as they can typically be formed by a single bending operation on a press brake. Of course, the bends could alternatively have a generally semi-circular configuration. Confronting semi-circular bends would define a channel 35 with a generally circular cross-section, which may be desirable in some instances. Alternatively, the bends could each have a generally square or rectangular configuration. Confronting square or rectangular bends would define a channel 35 with a generally square or rectangular cross-sectional configuration, which also may be suitable. Furthermore, the channels 35 can be defined between one bent plate (such as the upper plate in FIG. 5) and one flat plate (such as if the lower plate in FIG. 5 had no bends).

Plates 33 such as those illustrated in FIG. 5 can be formed from conventional sheet metal or the like. Bends can be made in such plates by a variety of conventional known bending operations. As noted above, the illustrated "V"-shaped bends could be readily machined into the plates using conventional press brake tools. In fact, existing press brake tools and dies are capable of forming an almost infinite variety of bend configurations. The machining of such plates would be well within the purview of those skilled in the present art and is not discussed in further detail.

As noted above, each channel 35 formed between the mated bodies 33 is adapted to slidably retain an edge portion 18 of an enclosure panel 12. This is perhaps best seen with reference to FIG. 6, which illustrates an end view of a frame member 30 wherein an enclosure panel 12 is slidably retained in each channel 35. The edge portions 18 of the illustrated enclosure panels 12 are enlarged. A peripheral panel area 17 extending from the panel edge portion 18 extends through the adjacent slot 38. As noted above, the panel edge portions 18 are retained in the channels 35 because the thickness of the edge portions 18 is greater than the width of the slots 38. The slot width is desirably at least slightly greater than the thickness of the peripheral panel areas 17, so the slots 38 will slidably accommodate the peripheral panel areas 12. Conjointly, the channel width is at least slightly greater than the thickness of the panel edge portions 18 such that the channels 35 will slidably accommodate the panel edge portions 18.

The bodies 33 can be retained in a mated configuration by any suitable fastening means. In accordance with one embodiment of the present invention, the bodies 33 of each frame member 30 can be retained in a mated configuration by a plurality of fasteners extending through each body 33. For example, the preferred frame member 30 embodiment illustrated in FIG. 5 includes a plurality of control fasteners 34 and a plurality of retention fasteners 32. In this embodiment, the retention fasteners 32 are provided to secure the plates in their desired final positions, while the control fasteners 34 are provided to allow further adjustment of the channel width and the slot width. For example, the retention fasteners can be secured directly to the brackets. Preferably, though, the retention fasteners 32 are secured to respective reinforcement members 60 which, in turn, are secured to the brackets 40.

The bodies 33 can be retained in a mated configuration by means other than fasteners extending through each body. If so desired, the bodies can be mated by one or more clamp-type fasteners. For example, a frame member may be retained in a mated configuration by sandwiching a spacer between two elongated bodies and securing one or more clamp-type devices around the frame member. It may be desirable to space a plurality of such clamps along the length of each frame member to assure the bodies are securely retained in such a mated configuration.

This type of embodiment is shown in FIG. 9, wherein the illustrated retention fasteners 32 extend through both plates 33 and into a reinforcement member 60. In the illustrated embodiment, the control fasteners 34 extend between the mated plates 33 and provide a further means for adjusting the channel width and the slot width of the frame member 30. For example, even after the plates 33 have been secured in a mated position about a spacer 31 having a desired size, the channel width and the slot width of the illustrated frame member 30 can be adjusted to a certain degree. This can be accomplished by adjusting the control fasteners 34 to move the side regions 37 and the side edges 39 of the plates 33 closer together or further apart. This can be particularly advantageous when it is desired to fine tune the fit of a given set of enclosure panels within the frame members. For example, the control fasteners 34 can be used to fine tune the snugness of the panel edge portions 18 within the channels 35. This can be useful when it is desired to make the enclosure panels 12 slide more easily along the channels 35. Thus, it is possible to adjust the fit of the channels 35 about the panel edge portions 18 with a great deal of precision.

The framework of the present construction enclosure system includes a plurality of reinforcement members 60. The reinforcement members 60 are adapted to be secured against respective frame members to increase the rigidity of such frame members. Each frame member 30 and the reinforcement member 60 attached thereto together define a reinforced frame member. Desirably, each reinforcement member 60 is adapted to be secured against a substantial length of a frame member 30, so as to substantially reinforce that frame member. If so desired, each reinforcement member 60 can be sufficiently long to be secured against more than one frame member 30. For example, as noted above, multiple frame members 30 can be secured in an end-to-end configuration. In such cases, it may be desirable to secure a single elongated reinforcement member 60 against the entire length of the connected frame members.

The reinforcement members 60 can be secured against either an interior face of the frame members or an exterior face of the frame members. It is to be understood that the designations herein of the "interior" and "exterior" faces of the frame members 30 are somewhat arbitrary. That is, neither of the two major faces of a given frame member 30 is required to be oriented toward or away from a building. Generally speaking, however, reference herein to the "interior" face of a frame member 30 will refer to that face which is intended to be oriented toward the building, while the "exterior" face refers to that face which is intended to be oriented away from the building.

In the preferred embodiment illustrated in FIG. 9, a reinforcement member 60 has been secured against the lower plate of the illustrated frame member 30. In this embodiment, the reinforcement member 60 retains the illustrated frame member 30 to the mounting region 46 of a bracket. Thus, the interior face of the illustrated frame member 30 would be the face to which the reinforcement member 60 is attached (i.e., the face defined by the lower plate in FIG. 9). Alternatively, the reinforcement members can be secured against the exterior face of a frame member. In such an embodiment (not shown), the interior face of the frame member can be secured directly to the mounting regions of respective brackets.

Each reinforcement member 60 preferably comprises a rigid elongated body. As the reinforcement members 60 are intended to increase the rigidity of the frame members 30 to which they are secured, it is desirable that the reinforcement members 60 themselves have a rigid construction. For example, the reinforcement members 60 are advantageously formed of metals or other rigid materials. In a particularly preferred embodiment, each reinforcement member 60 has a "C"-shaped cross-sectional configuration that is particularly rigid and can be readily secured to a frame member 30 (as will be more thoroughly discussed below).

The reinforcement member 60 illustrated in FIG. 7 has been found to be particularly well suited for use with the present construction enclosure system. The illustrated reinforcement member 60 has a generally "C"-shaped cross-sectional configuration formed by a base web 63 extending between the respective bottom ends of two side webs 66 where between there is formed a generally square channel 65. The generally square channel 65 is somewhat slotted due to the inturned edges 69 of the side webs 66. Components with such a configuration are sold commercially under the trade name Unitstrut Metal Framing by the Unistrut Corporation, which has a place of business in Itasca, Ill., U.S.A.

Figure 2:
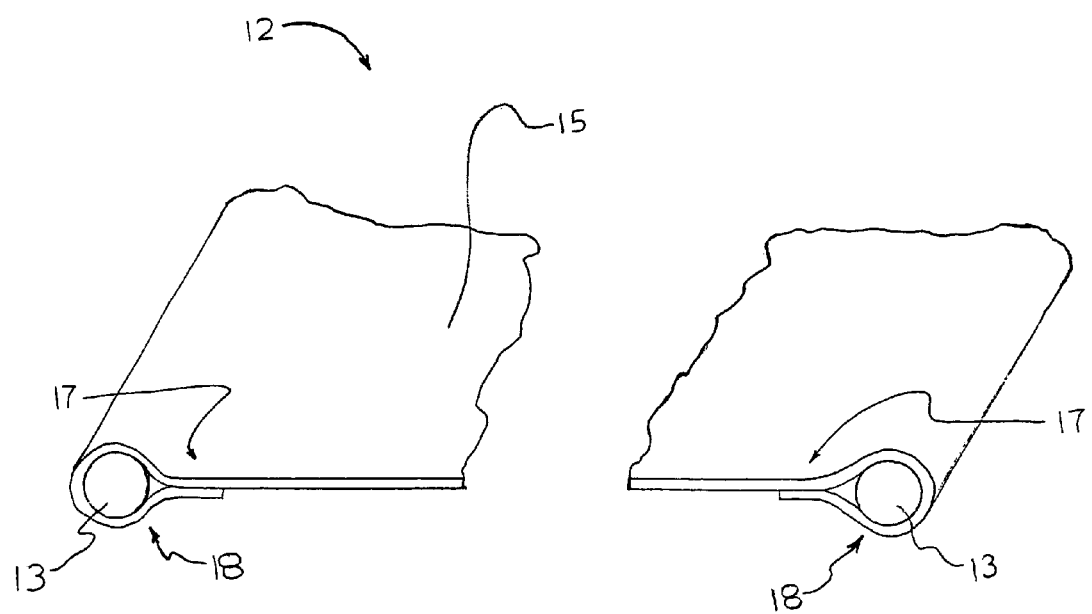
FIG. 2 is a broken-away perspective view of a preferred enclosure panel design of the present invention.
Figure 3:
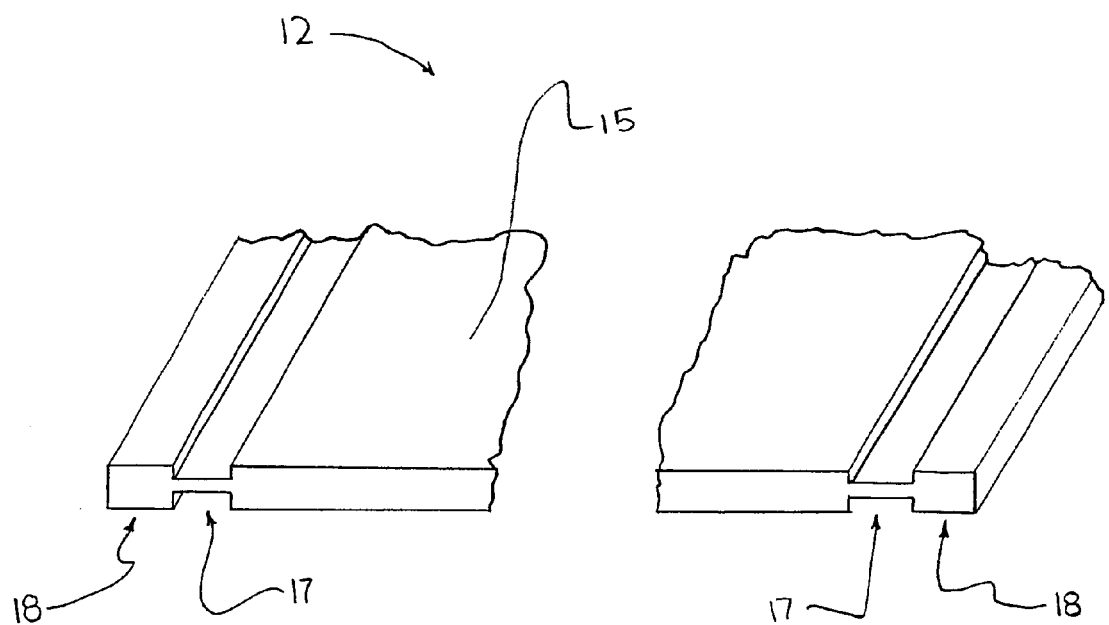
FIG. 3 is a broken-away perspective view of an alternative preferred enclosure panel of the present invention.

The construction enclosure system comprises a plurality of sheet-like enclosure panels 12. In the embodiment of FIG. 1, a plurality of enclosure panels 12 are carried adjacent an outer face of a building 9. As is best seen in FIGS. 2 and 3, the enclosure panels (or "sheets") each have a major surface 15 and substantially parallel first and second edge portions 18. Each edge portion 18 has a greater thickness than a peripheral panel area 17 extending from such edge portion 18. That is, each peripheral panel area 17 is not as thick as the adjacent edge portion 18 from which it extends. This can be achieved, for example, by providing enclosure panels 12 that have enlarged edge portions 18.

FIG. 2 illustrates a particularly useful enclosure panel wherein the edge portions 18 are enlarged. Each enlarged edge portion 18 is formed by a rope welt, wherein the edge of the panel is folded over a rope 13 and secured to itself and/or the rope 13. Rope welts are practical because they are relatively flexible and easy to manipulate, while standing up quite well to continued use. They also tend to be relatively easy and inexpensive to manufacture. In fact, it may be feasible in some cases to make an enclosure panel having rope welt edges using existing tarps and ropes. In such cases, it would be possible to avoid the expense of having to custom manufacture the enclosure panels 12.

The edge portions 18 of the enclosure panels need not be formed by rope welts. In fact, it is not necessary that the edge portions 18 of the panels be enlarged. However, the enclosure panels are preferably dimensioned such that they can be slidably retained in the channels defined by the frame members. This is perhaps best seen with reference to FIG. 6, wherein there is shown an end view of a preferred frame member 30 carrying two enclosure panels 12. Each channel 35 is defined by the illustrated frame member 30 retains an enlarged edge portion 18 of an enclosure panel 12. As will be discussed in more detail below, the edge portions 18 are retained within the channels, but can be slidably moved along the length of the channels.

FIG. 3 illustrates an alternative panel design wherein the panel edge portions 18 of the panel 12 are not enlarged. Each of the peripheral panel areas 17 of the illustrated panel 12 is formed by a slot. The edge portions 18 of the panel 12 have the same thickness as the rest of the panel, with the exception of the slots which of course have a reduced thickness. Although the edge portions in this embodiment are not enlarged, they can be slidably retained by the frame members in the manner illustrated in FIG. 6. As will be obvious to those skilled in the present art, a variety of other panel configurations could also be used with the present invention.

The enclosure panels can be formed of any suitable sheet-like material. The ideal material for a given application will depend upon the desired panel properties. For example, different applications may require panels with varying degrees of translucency, strength, flame retardency, and ease of handling. Various plastics, fabrics, and other materials can be used. One material that has been found to be particularly useful is fire-retardant, reinforced polyester. Similarly, various types of vinyl-coated polyester may be employed. Such materials are commercially available from Custom Canvas Manufacturing Co., Inc, which is located in Buffalo, N.Y., U.S.A.

The enclosure panels can be used to create a controlled-environment envelope within a structure (such as a heated environment or an air-conditioned environment). In such cases, it may be beneficial to form the panels of an insulated material. For example, the enclosure panels may comprise multiple layers of fabric, one or more of which may include an insulative batting. In other circumstances, it may be desirable to use enclosure panels formed of a screen or net-like material. In still other cases, panels that are at least somewhat water impermeable may be preferred. Regardless of the application, the selection of an appropriate panel material for a given enclosure will be well within the purview of those skilled in the present art.

The invention also extends to construction enclosure systems, including prior art construction enclosure systems, that have been provided with reinforcement members in accordance with the present invention. For example, an enclosure system may comprise a plurality of elongated frame members wherein each frame member comprises a single body defining at least one channel extending along a substantial length of the body. Alternatively, an enclosure system may comprise frame members that each comprise a single body defining first and second slotted channels extending respectively along first and second side regions of the body. The present invention would extend to such an enclosure system which has been provided with a plurality of reinforcement members 60.

Employing reinforcement members formed of commercially available components, such as Unitstrut Metal Framing components, can be considerably less expensive than custom manufacturing reinforcement members 60. Furthermore, it can be quite expensive to have frame members 30 custom manufactured so as to incorporate a reinforcement structure that is integral in construction with the frame member body.

The present enclosure system will commonly be subjected to substantial wind forces. Thus, the system is advantageously designed to complement the particular wind forces that are anticipated for a given application. This may involve accounting for the specific environment in which the enclosure system will be used. For example, the maximum and extreme wind velocities observed in various geographic areas of the United States are available from the U.S. Weather-Bureau. Wind forces also depend on how high above the ground the enclosure system is positioned. The velocity of natural wind is reduced near the ground due to friction. For example, according to Section 12 of Marks Standard Handbook For Mechanical Engineers, $9^{th}$-ed.; New York, McGraw-Hill (the teachings of which are herein incorporated by reference), the velocity of wind at a height of 50 feet (15.2 m) is about 90 percent as great as it is at 100 feet (30.5 m). The roughness of the terrain near a job site, which also affects the wind velocity, can be considered as well.

The construction enclosure system is advantageously tailored to accommodate the wind forces that are anticipated for a given location. For example, in cases where the enclosure system is expected to encounter unusually strong winds, the frame members can be more closely spaced to provide additional reinforcement to the enclosure panels. In one embodiment of the invention, the enclosure panels carried adjacent a particularly exposed area of a building are stronger than those in other areas of the building. For example, the panels adjacent an upper region of the building can be formed of a more durable material than those adjacent the lower regions of the building. Similarly, the panels carried adjacent an upper region of the building can have a greater thickness than those elsewhere. As is discussed below in further detail, a preferred embodiment of the present invention provides a particularly useful frame member that is adjustable to facilitate use of enclosure panels having a variety of different thicknesses.

In some cases, a significant portion of the normal forces endured by the enclosure panels 12 during use may be caused by differences in the air pressure outside the panels and inside the panels. To reduce such pressure differences, one embodiment of the invention provides a plurality of grommets spaced about the major surface of each panel. For example, it is anticipated that spacing such grommets every 10–20 inches about a panel would reduce this pressure difference without greatly reducing the strength of the panels.

The present invention also extends to methods for at least partially enclosing a structure under construction, as well as to structures built by such methods. A plurality of brackets are rigidly and removably attached to a structure. As noted above, each bracket desirably has a base region that is adapted to be attached to a floor or another structural member of the building. As building floors are commonly formed of concrete, the brackets can be advantageously secured thereto with concrete anchors. Alternatively, a variety of bolts, screws, or the like may be used. When the brackets are anchored using convention bolts or screws, it is preferable to anchor each bracket using at least two such fasteners so as to obviate the possibility of the brackets pivoting about a single fastener.

The brackets can be manufactured so as to define anchor holes through which the concrete anchors or the like will be extended when the brackets are attached to a building. Alternatively, the anchor holes can be drilled or otherwise machined into the brackets subsequent to their manufacture, but prior to, or contemporaneous with, their installation. Once the anchor holes have been formed in the brackets, it can be desirable to drill anchor guide holes into the floor of the building (or any other surface to which the brackets will be anchored). For example, the brackets can be placed in their intended final positions on the floor of a building, and guide hole markings can be made on those points on the floor beneath the anchor holes. Anchor guide holes can then be drilled or otherwise formed in the floor. These anchor guide holes desirably have a diameter that is slightly smaller than that of the anchors, such that the anchors will fit snuggly within the guide holes upon being set therein.

The brackets desirably also have mounting regions that are adapted to fixedly retain a plurality of rigid elongated frame members in a desired spatial relationship with an outer face of the structure. In a preferred method, the base region of each bracket is secured to the floor of the structure in a planking configuration wherein a proximal end of each bracket is positioned inwardly from a peripheral edge of the floor, while a distal end of the bracket extends outwardly from such edge. Desirably, the mounting region of each bracket is at the distal end of the bracket as this will facilitate spacing the frame members outwardly from the outer face of the building.

A plurality of rigid elongated frame members are provided. Desirably, each frame member defines first and second substantially parallel channels extending respectively along first and second side regions thereof. A variety of preferred frame member embodiments are particularly well suited for use with the present method. For example, the frame member embodiments discussed above, wherein each frame member comprises a pair of elongated bodies adapted to be retained in a mated configuration to cooperatively define first and second channels therebetween, would be particularly useful with the present methods. However, it is to be understood that any of a variety of other frame members could be used with the present method. For example, each frame member can alternatively comprise a single body defining one or more channels each adapted to receive an enlarged edge portion of an enclosure panel.

A plurality of reinforcement members are also provided. The reinforcement members are adapted to be secured against respective frame members. As noted above, the reinforcement members are intended to increase the rigidity of the frame members to which they will be secured. Thus, each reinforcement member preferably comprises a rigid elongated body which, for example, can be formed of a metal or other rigid material. In a preferred reinforcement member embodiment, each reinforcement member has a "C"-shaped cross-sectional configuration that is particularly rigid and can be readily secured to a frame member, as was discussed above.

The reinforcement members are secured against respective frame members to increase the rigidity of such frame members, thereby defining reinforced frame members. It is to be understood that the term "reinforced frame member" is used herein to refer collectively to a frame member and a reinforcement member which has been secured to that frame member. The reinforcement members can be secured against either an interior face of the frame members or an exterior face of the frame members. As discussed above, while the designations of "interior" and "exterior" frame member faces are somewhat arbitrary, reference to the "interior" face of a frame member tends generally to refer to that face which is oriented toward a building, while the "exterior" face refers to that face which is oriented away from the building.

The reinforcement members can be secured against the frame members in any suitable manner. In a preferred method, a plurality of fasteners are used to connect the reinforcement members to respective frame members. As noted above, the reinforcement members can be secured to respective frame members by extending a plurality of fasteners through each frame member and into a reinforcement member. This is perhaps best seen with reference to FIG. 7, wherein there is illustrated a reinforcement member 60 that has been secured to a preferred frame member 30 embodiment. Screws 32 can be advanced in a conventional manner through both plates 33 of the frame member 30 and into the reinforcement member 60. For example, screw guide holes can be drilled or otherwise formed in the plates and/or the reinforcement member at the desired locations. These screw guide holes desirably have a diameter that is slightly smaller than that of the screws, such that the screws will fit snuggly within the guide holes upon being advanced therethrough. Thereafter, the screws can be inserted into, and advanced through, the guide holes in the frame member and the reinforcement member. In accordance with the preferred reinforcement member 60 embodiment illustrated in FIG. 7, the screws 32 are desirably advanced through the frame member 30 and into the base web 63 of the reinforcement member 60.

The reinforced frame members are rigidly secured to respective brackets. In a preferred method, the reinforced frame members are secured to the brackets via the reinforcement members. As noted above, the reinforcement members 60 can be secured directly to the mounting regions 46 of respective brackets 40. For example, as was discussed above with reference to FIG. 9, a preferred reinforcement member 60 can be connected to the mounting region 46 of a bracket with a mounting bolt 49 and spring nut 45 assembly. The mounting bolt 49 is extended through the bracket mounting region 46 and into the spring nut member 45 secured behind the inturned edges 69 of the illustrated reinforcement member 60. In this regard, a bolt guide hole is desirably formed, such as by a conventional drilling operation, in the mounting region of each bracket prior to securing the reinforced frame members to the brackets. A washer 47 is optionally provided between the head of the mounting bolt 49 and the mounting region 46 of the bracket.

As is perhaps best understood by referring to FIG. 7, the reinforced frame members can alternatively be secured to the brackets via the frame members. For example, the reinforced frame member illustrated in FIG. 7 could be secured to the mounting regions of respective brackets (not shown) by connecting such bracket mounting regions to the top plate 33 illustrated in FIG. 7. For example, a plurality of screws or the like could be extended through each bracket mounting region 46 and into the top plate 33 of the illustrated frame member 30. For example, it may be desirable to insert such screws into the illustrated frame member 30 through those areas of the top plate 33 defined between each retention fastener 32 and the adjacent control fastener 34. These screws are desirably extended through the top plate 33 and also into the bottom plate 33, as this would provide a more stable seating for such screws.

At least one sheet-like enclosure panel is provided. As was discussed above with reference to FIGS. 2 and 3, the enclosure panel desirably has first and second edge portions that each have a thickness greater than a peripheral panel area extending therefrom. For example, in a preferred method, there is provided an enclosure panel having enlarged first and second edge portions. Depending on the dimensions of the desired enclosure, it may be necessary to provide a plurality of such enclosure panels. One of ordinary skill in the art will be readily able to determine the number and size of the enclosure panels required for a given job.

The enclosure panel is positioned between a pair of reinforced frame members such that the first edge portion is slidably retained in one of the channels in a first reinforced frame member of the pair, while the second edge portion of the panel is slidably retained in one of the channels in a second reinforced frame member of the pair. This is perhaps best seen with reference to FIG. 1, wherein each illustrated enclosure panel 12 is retained between two adjacent frame members 30.

The enclosure panel 12 can be secured between two adjacent frame members by positioning the panel between the frame members 30 such that the first and second panel edge portions 18 are each adjacent one of the frame members 30. As is perhaps best seen with reference to FIG. 6, the edge portions 18 of the panel can be slidably secured within the channels 35 by simply inserting each panel edge portion 18 into the open end of one of the channels 35 defined by the adjacent frame member 30. The panel edge portions 18 can then be fed further into the channels 35 until the entire length of the panel edge portions 18 are fully disposed within the channels 35. When a frame member 30 such as that illustrated in FIG. 6 is employed, the control fasteners 34 can be adjusted at this stage to either tighten or loosen the snugness of the edge portions 18 within the channels 35. For example, this would typically be desirable when the enclosure panel 12 is difficult to move along the frame members 30.

While a preferred embodiment of the present invention has been described, it should be understood that various changes, adaptations and modifications may be made therein without departing from the spirit of the invention and the scope of the appended claims.

What is claimed is:

1. A framework for a construction enclosure system, comprising:
    a) a plurality of brackets adapted to be rigidly and removably attached to a structure under construction; and
    b) a plurality of rigid elongated frame members adapted to be fixedly retained by the brackets in a desired spatial relationship with an outer face of the structure, each frame member defining first and second substantially parallel channels extending respectively along first and second side regions thereof, each channel being adapted to slidably retain an edge portion of a sheet-like enclosure panel, wherein the edge portion has a greater thickness than a peripheral panel area extending therefrom; and
    c) a plurality of reinforcement members adapted to be secured against respective frame members to increase the rigidity of such frame members;
    wherein at least one of the frame members comprises a pair of elongated bodies adapted to be retained in a mated configuration to cooperatively define the first and second channels such that a spacing distance between the mated elongated bodies is adjustable to provide a corresponding channel width, said bodies being adapted to be mated by one or more fasteners extending through each body such that the channel width can be adjusted by adjusting at least one of the fasteners.

2. The framework of claim 1 wherein the reinforcement members are adapted to retain the respective frame members to the brackets.

3. The framework of claim 1 wherein each of the reinforcement members comprises a rigid elongated body adapted to be secured against a substantial length of at least one of the frame members.

4. The framework of claim 1 wherein at least one of the reinforcement members has a "C"-shaped cross-section.

5. The framework of claim 1 wherein each body comprises a rigid plate.

6. The framework of claim 5 wherein the channels are defined by bends in one or both of the plates.

7. The framework of claim 1 wherein a side edge of one of said elongated bodies when mated with the other of said elongated bodies defines a slot together with an adjacent side edge of the other of said elongated bodies, said adjacent side edges having a divergent configuration.

8. A construction enclosure system, comprising:
    a) a plurality of sheet-like enclosure panels each having a major surface and substantially parallel first and second edge portions, each edge portion having a greater thickness than a peripheral panel area extending therefrom;
    b) a framework, comprising:
        i) a plurality of brackets adapted to be rigidly and removably attached to a structure under construction;
        ii) a plurality of rigid elongated frame members adapted to be fixedly retained by the brackets in a desired spatial relationship with an outer face of the structure, each frame member defining first and second substantially parallel channels extending respectively along first and second side regions thereof, each channel being adapted to slidably retain one of said panel edge portions;
        iii) a plurality of reinforcement members adapted to be secured against respective frame members to increase the rigidity of such frame members;
        wherein at least one of the frame members comprises a pair of elongated bodies adapted to be retained in a mated configuration to cooperatively define the first and second channels such that a spacing distance between the mated elongated bodies is adjustable to provide a corresponding channel width, said bodies being adapted to be mated by one or more fasteners extending through each body such that the channel width can be adjusted by adjusting at least one of the fasteners.

9. The construction enclosure system of claim 8 wherein the reinforcement members are adapted to retain the respective frame members to the brackets.

10. The construction enclosure system of claim 8 wherein each of the reinforcement members comprises a rigid elongated body adapted to be secured against a substantial length of at least one of the frame members.

11. The construction enclosure system of claim 8 wherein at least one of the reinforcement members has a "C"-shaped cross-section.

12. The construction enclosure system of claim 10 wherein each body comprises a rigid plate.

13. The construction enclosure system of claim 12 wherein the channels are defined by bends in one or both of the plates.

14. A method of at least partially enclosing a structure under construction, comprising:
    a) providing a construction enclosure system according to claim 8;
    b) rigidly and removably attaching the brackets to the structure;
    c) securing the reinforcement members against respective frame members to increase the rigidity of such frame members, thereby defining reinforced frame members;
    d) rigidly securing the reinforced frame members to the brackets such that the reinforced frame members are fixedly retained in a desired spatial relationship with an outer face of the structure; and e) positioning at least one of the enclosure panels between a pair of the reinforced frame members such that the first edge portion is slidably retained in one of the channels in a first reinforced frame member of the pair and the second edge portion is slidably retained in one of the channels in a second reinforced frame member of the pair.

15. The construction enclosure system of claim 8 wherein a side edge of one of said elongated bodies when mated with the other of said elongated bodies defines a slot together with an adjacent side edge of the other of said elongated bodies, said adjacent side edges having a divergent configuration.

16. A framework for a construction enclosure system, comprising:
   a) a plurality of brackets adapted to be rigidly and removably attached to a structure under construction; and
   b) a plurality of rigid elongated frame members adapted to be fixedly retained by the brackets in a desired spatial relationship with an outer face of the structure, at least one of the frame members comprising first and second elongated bodies and defining first and second substantially parallel channels and first and second slots communicating respectively with the first and second channels, each such slotted channel being adapted to slidably retain an edge portion of a sheet-like enclosure panel, wherein the edge portion has a greater thickness than a peripheral panel area extending therefrom, wherein each said slot is defined between a side edge of the first body and an adjacent side edge of the second body, and wherein said adjacent first and second side edges have a divergent configuration; and
   c) a plurality of reinforcement members adapted to be secured against respective frame members to increase the rigidity of such frame members.

17. The framework of claim 16 wherein the reinforcement members are adapted to retain the respective frame members to the brackets.

18. The framework of claim 16 wherein each of the reinforcement members comprises a rigid elongated body adapted to be secured against a substantial length of at least one of the frame members.

19. The framework of claim 16 wherein at least one of the reinforcement members has a "C"-shaped cross-section.

20. The framework of claim 16 wherein each body comprises a rigid plate.

21. The framework of claim 20 wherein the channels are defined by bends in one or both of the plates.

22. The framework of claim 16 wherein said first and second elongated bodies are retained in a mated configuration to cooperatively define said first and second channels such that a spacing distance between said mated elongated bodies is adjustable to provide a corresponding channel width, said mated elongated bodies being mated by one or more fasteners extending through each body such that the channel width can be adjusted by adjusting at least one of the fasteners.

23. A construction enclosure system, comprising:
   a) a plurality of sheet-like enclosure panels each having a major surface and substantially parallel first and second edge portions, each edge portion having a greater thickness than a peripheral panel area extending therefrom;
   b) a framework, comprising:
      i) a plurality of brackets adapted to be rigidly and removably attached to a structure under construction;
      ii) a plurality of rigid elongated frame members adapted to be fixedly retained by the brackets in a desired spatial relationship with an outer face of the structure, at least one of the frame members comprising first and second elongated bodies and defining first and second substantially parallel channels and first and second slots communicating respectively with the first and second channels, each such slotted channel being adapted to slidably retain one of said panel edge portions, wherein each said slot is defined between a side edge of the first body and an adjacent side edge of the second body, and wherein said adjacent first and second side edges have a divergent configuration; and
      iii) a plurality of reinforcement members adapted to be secured against respective frame members to increase the rigidity of such frame members.

24. The construction enclosure system of claim 23 wherein the reinforcement members are adapted to retain the respective frame members to the brackets.

25. The construction enclosure system of claim 23 wherein each of the reinforcement members comprises a rigid elongated body adapted to be secured against a substantial length of at least one of the frame members.

26. The construction enclosure system of claim 23 wherein at least one of the reinforcement members has a "C"-shaped cross-section.

27. The construction enclosure system of claim 23 wherein each body comprises a rigid plate.

28. The construction enclosure system of claim 27 wherein the channels are defined by bends in one or both of the plates.

29. The construction enclosure system of claim 23 wherein said first and second elongated bodies are retained in a mated configuration to cooperatively define said first and second channels such that a spacing distance between said mated elongated bodies is adjustable to provide a corresponding channel width, said mated elongated bodies being mated by one or more fasteners extending through each body such that the channel width can be adjusted by adjusting at least one of the fasteners.

30. A method of at least partially enclosing a structure under construction, comprising:
   a) providing a construction enclosure system according to claim 23;
   b) rigidly and removably attaching the brackets to the structure;
   c) securing the reinforcement members against respective frame members to increase the rigidity of such frame members, thereby defining reinforced frame members;
   d) rigidly securing the reinforced frame members to the brackets such that the reinforced frame members are fixedly retained in a desired spatial relationship with an outer face of the structure; and
   e) positioning at least one of the enclosure panels between a pair of the reinforced frame members such that the first edge portion is slidably retained in one of the channels in a first reinforced frame member of the pair and the second edge portion is slidably retained in one of the channels in a second reinforced frame member of the pair.

* * * * *